(12) United States Patent
Schmidt-Ellinger et al.

(10) Patent No.: US 11,912,502 B2
(45) Date of Patent: Feb. 27, 2024

(54) GRIPPER FOR A PICKING DEVICE AND METHOD FOR OPERATING THE PICKING DEVICE

(71) Applicant: Becton Dickinson Rowa Germany GmbH, Kelberg (DE)

(72) Inventors: Hardy Schmidt-Ellinger, Gerolstein (DE); Bernd Nellinger, Beuren (DE); Stephan Brokonier, Neroth (DE); Dietmar Gross, Kelberg (DE); Jochen Daumen, Urmitz (DE)

(73) Assignee: Becton Dickinson Rowa Germany GmbH, Kelberg (DE)

( * ) Notice: Subject to any disclaimer, the term of this patent is extended or adjusted under 35 U.S.C. 154(b) by 36 days.

(21) Appl. No.: 17/704,304

(22) Filed: Mar. 25, 2022

(65) Prior Publication Data

US 2022/0212870 A1 Jul. 7, 2022

Related U.S. Application Data

(63) Continuation of application No. 16/752,845, filed on Jan. 27, 2020, now Pat. No. 11,319,150.

(51) Int. Cl.
*G06F 7/00* (2006.01)
*B65G 1/137* (2006.01)
(Continued)

(52) U.S. Cl.
CPC ............... *B65G 1/137* (2013.01); *A61J 1/16* (2013.01); *B65G 61/00* (2013.01);
(Continued)

(58) Field of Classification Search
CPC ................... B65G 1/137; B65G 61/00; B65G 2203/0233; B65G 2203/042; B65G 47/90;
(Continued)

(56) References Cited

U.S. PATENT DOCUMENTS 4,350,381 A * 9/1982 Hellmann ............ B25J 15/0009
901/37
10,265,862 B1 * 4/2019 Alqasemi ............ B25J 15/0033
(Continued)

FOREIGN PATENT DOCUMENTS

DE 2530385 A1 1/1977
DE 3313754 A1 10/1984
(Continued)

OTHER PUBLICATIONS

Extended European Search Report for Application No. 20153879.0, dated Nov. 6, 2020, 17 pages.
(Continued)

*Primary Examiner* — Yolanda R Cumbess
(74) *Attorney, Agent, or Firm* — Morgan, Lewis & Bockius LLP

(57) ABSTRACT

Grippers for a picking device for drug packages and methods for operating the picking device are provided. The gripper has a tray having an end portion with an arcuate front, the end portion forming a loading and unloading front. The gripper further includes a transport device arranged above the tray and configured for moving drug packages from a storage surface onto the tray, and at least one sensor arranged in the end portion of the tray and configured to determine a presence of a drug package in a detection area of the at least one sensor.

20 Claims, 8 Drawing Sheets

(51) Int. Cl.
  *G07F 17/00*   (2006.01)
  *B65G 61/00*   (2006.01)
  *A61J 1/16*    (2023.01)
  *B25J 11/00*   (2006.01)

(52) U.S. Cl.
  CPC ....... *G07F 17/0092* (2013.01); *A61J 2200/70* (2013.01); *B25J 11/009* (2013.01); *B65G 2203/0233* (2013.01); *B65G 2203/042* (2013.01)

(58) Field of Classification Search
  CPC ........ B65G 47/905; B65G 1/0435; A61J 1/16; A61J 2200/70; B25J 15/0028; B25J 11/009; G07F 17/0092; G07F 11/165
  USPC .................................. 700/213–214, 218, 223
  See application file for complete search history.

(56) References Cited

U.S. PATENT DOCUMENTS

| | | | |
|---|---|---|---|
| 11,319,150 B2 | 5/2022 | Schmidt-Ellinger | |
| 2018/0111757 A1 | 4/2018 | Abe et al. | |
| 2019/0022855 A1* | 1/2019 | Hellenbrand | ........ B25J 15/0213 |
| 2020/0063919 A1* | 2/2020 | Nicolas | ............... E21B 41/0007 |

FOREIGN PATENT DOCUMENTS

| | | |
|---|---|---|
| EP | 2620391 A1 | 7/2013 |
| JP | S53153689 U | 12/1978 |
| WO | WO-2019015815 A1 | 1/2019 |

OTHER PUBLICATIONS

European Office Action for Application No. 20215874.7, dated Jun. 29, 2023, 8 pages including translation.

Extended European Search Report for Application No. 20215874.7, dated May 21, 2021, 13 pages including translation.

International Search Report and Written Opinion for Application No. PCT/EP2021/051196, dated Apr. 9, 2021, 25 pages including translation.

International Search Report and Written Opinion for Application No. PCT/EP2021/081175, dated Feb. 2, 2022, 25 pages including translation.

Second Extended European Search Report for Application No. 20153879.0, dated Feb. 19, 2021, 19 pages including translation.

* cited by examiner

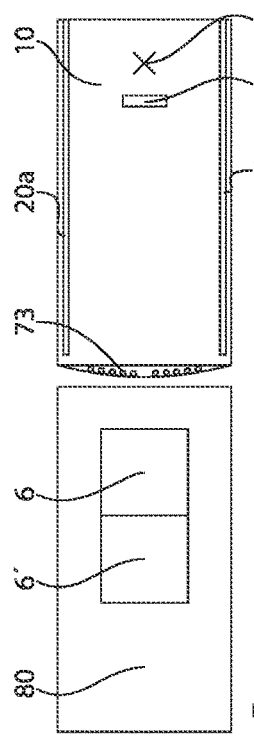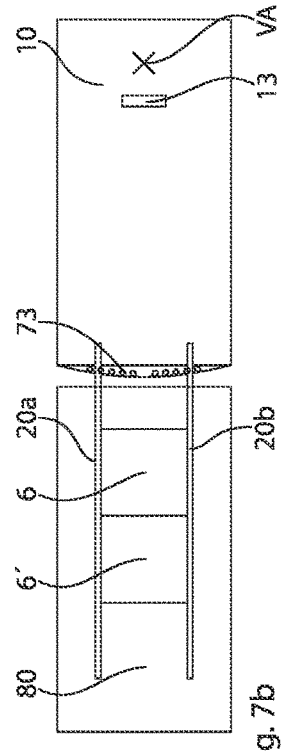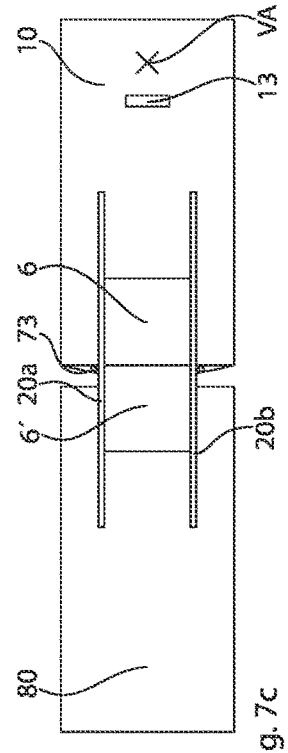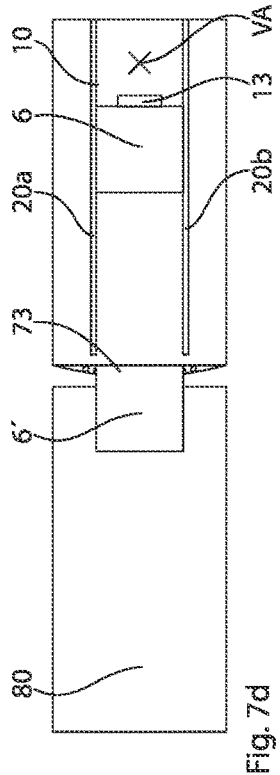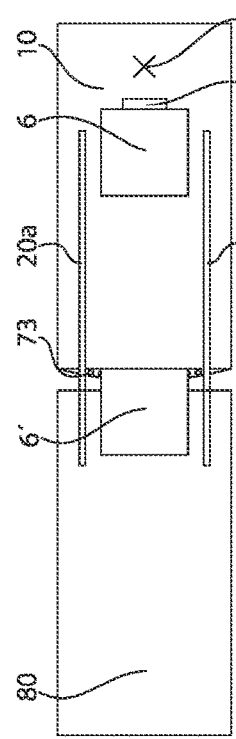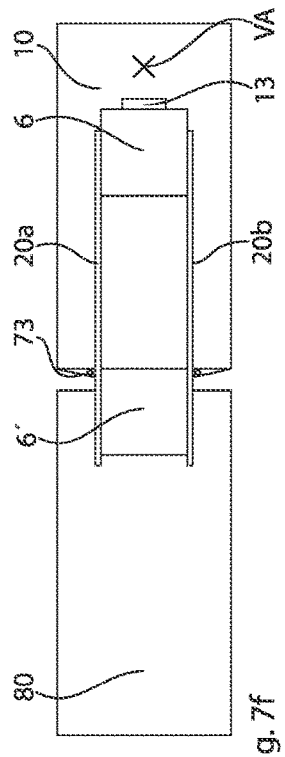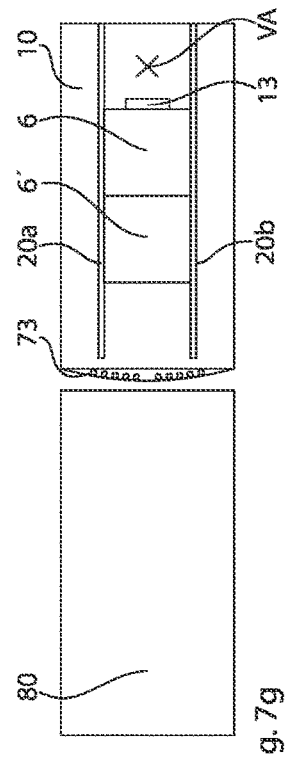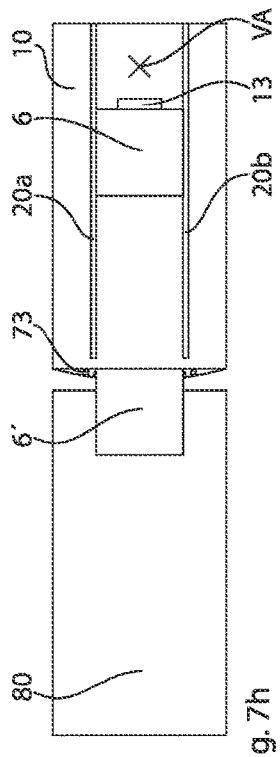

GRIPPER FOR A PICKING DEVICE AND METHOD FOR OPERATING THE PICKING DEVICE

CROSS-REFERENCE TO RELATED APPLICATIONS

This application is a continuation of U.S. patent application Ser. No. 16/752,845, entitled "GRIPPER FOR A PICKING DEVICE AND METHOD FOR OPERATING THE PICKING DEVICE," filed on Jan. 27, 2020, which issued as U.S. Pat. No. 11,319,150 on May 3, 2022, the entire content of which is incorporated by referenced herein.

BACKGROUND

The present disclosure relates to a gripper for a picking device for piece goods, in particular drug packages, and a method for operating the picking device, in particular for verifying a movement of drug packages onto a tray table of such a gripper.

SUMMARY

One or more embodiments a gripper for drug packages. The gripper includes a tray having an end portion with an arcuate front, the end portion forming a loading and unloading front. The gripper also includes a transport device arranged above the tray, the transport device configured to move drug packages from a storage surface onto the tray. The gripper further includes at least one sensor arranged in the end portion of the tray, the at least one sensor configured to determine a presence of a drug package in a detection area of the at least one sensor.

One or more embodiments provide a system for drug packages. The system includes a storage location configured to store one or more drug packages and a picking device comprising a gripper. The gripper includes a tray having an end portion with an arcuate front, the end portion forming a loading and unloading front. The gripper also includes a transport device arranged above the tray, the transport device configured to move drug packages from the storage location onto the tray. The gripper further includes a sensor assembly arranged in the end portion of the tray, the sensor assembly configured to determine a presence of a drug package in a detection area of the sensor assembly.

One or more embodiments provide a method of verifying a movement of drug packages onto a tray of a gripper. The method includes moving a transport device arranged above the tray to a storage location of at least one drug package and gripping the at least one drug package. The method also includes moving the transport device from the storage location to the tray, the tray having an end portion with an arcuate front, the end portion forming a loading and unloading front. The method further includes checking, by at least one sensor arranged in the end portion, if a drug package is present in a detection area of the at least one sensor and providing a signal indicating a first erroneous removal attempt if the check is positive.

The foregoing and other features, aspects and advantages of the disclosed embodiments will become more apparent from the following detained description and accompanying drawings.

BRIEF DESCRIPTION OF THE DRAWINGS

In the following, one or more embodiments of the gripper according to the disclosure and the method according to the disclosure will be described in more detail with reference to the drawings.

FIG. 1b is a perspective view of the gripper of FIG. 1a.

FIG. 2b is a top plan view of the gripper of FIG. 2a.

FIGS. 7a-7h are schematic diagrams of different stages of one or more embodiments of a method for operating a picking device having a gripper according to the disclosure.

DETAILED DESCRIPTION

Figure 1A:
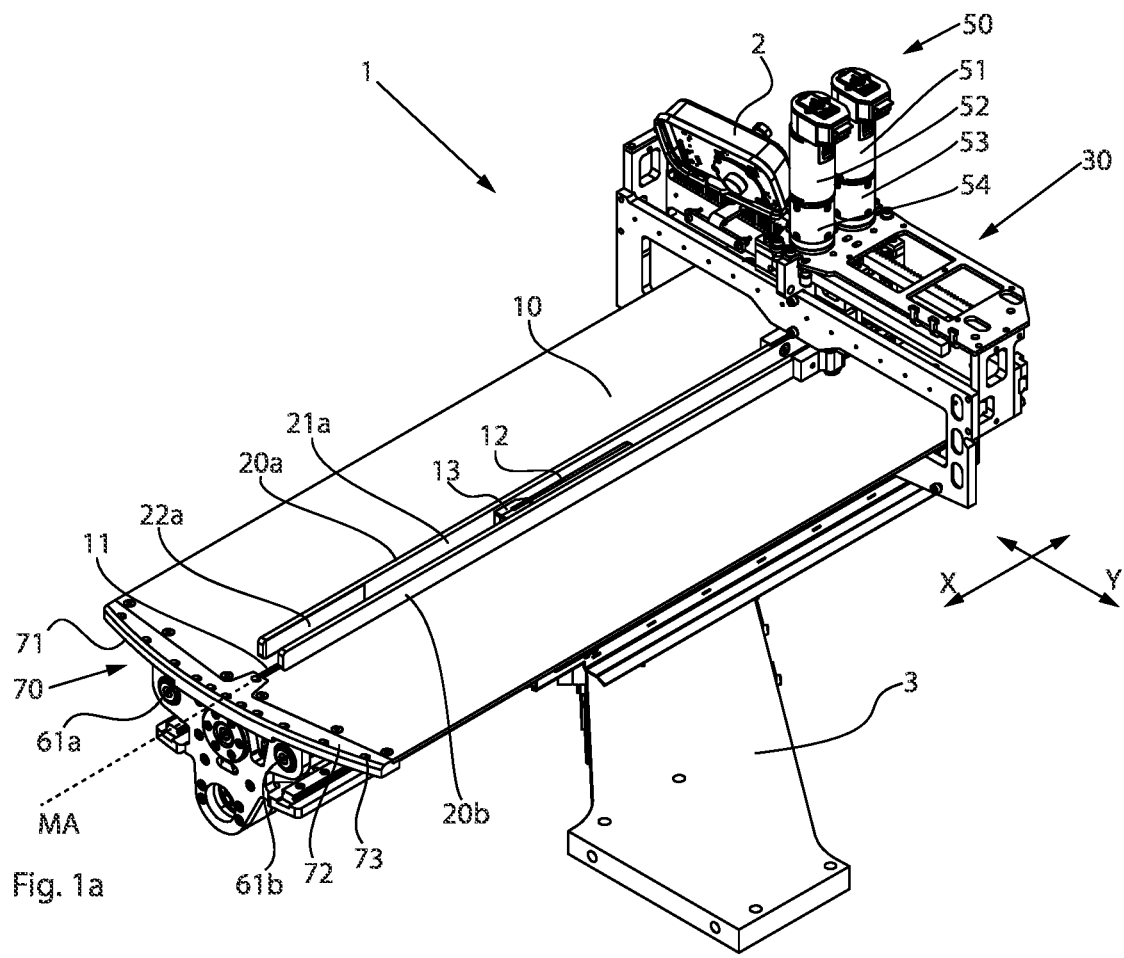
FIG. 1a is a perspective view of a gripper according to the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In known grippers of operating systems for picking devices for drug packages, the loading and unloading face of the tray table of the gripper is straight. This front is moved for moving drug packages onto or from the tray table to a storage location, wherein the storage location may be, for example, a shelf or a conveyor belt for moving drug packages in or out of the picking device. For this purpose, the gripper with its tray table can be moved frontally along the longitudinal axis of the tray table to the storage location. Alternatively, the gripper can be pivoted or rotated for the tray table to approach the storage location. The straight front then requires when performing only a rotational or pivotal movement that a gap remains between the front and the storage location, wherein the width of the gap is dependent on the width of the tray table. When using larger grippers with correspondingly wide tray tables, this gap is increasingly wider, so that it is necessary in such a case, to reduce the gap by moving the gripper after pivoting or rotating the gripper. Alternatively, you can form the front of the tray table in a bent manner. This requires that after a pivoting or rotational movement for positioning the gripper, the gap is smaller, at least in the middle of the curved front, but increases to the sides of the tray table.

When moving drug packages from a storage location onto the tray table, it may happen that the drug package remains hanging in the gap between the storage location and the front of the tray table and is only partially pulled onto the tray table. In the case of known grippers with a straight front side, this is detected by a light barrier arranged at the front of the tray table which faces a storage location, is which can detect when drugs have become stuck.

Depending on the design of the curved front, however, a portion of the tray table remains, which cannot be detected with a light barrier, since this light barrier must be located in the areas of the tray table where the tray table is not yet bent. This causes that such incorrect removals, which do not extend into the detection area of the light barrier, are not recognized and the operating device assumes a correct movement of a drug package onto the gripper, although the drug package partially rests in the bent portion of the front of the tray table.

It is an object of the present disclosure to provide a gripper in which an incorrect movement of a drug package onto the tray table of a gripper can be detected even with a curved front of the tray table. It is another object of the present disclosure to provide a method for verifying a movement of drug packages onto the tray table.

This object is achieved by a gripper for a picking device with horizontal storage surfaces for the storage of drug packages. The gripper according to the disclosure comprises a tray table extending in a first horizontal direction (X-direction) and a second horizontal direction (Y-direction) orthogonal to the first horizontal direction, having an end portion with an arcuate front extending in the Y-direction, said end portion forming the loading and unloading front, said tray table and said end portion defining an upper support surface.

A transport device movable in the first horizontal direction is arranged above the tray table for moving drug packages from a horizontal storage surface onto the tray table. To grasp a drug package, the transport device is first moved in the X-direction to a storage location of a drug package. Once the transport device is properly positioned, a drug package is gripped and the transport device is again moved in the X-direction toward the tray table, thereby pulling the drug package onto the tray table. In this pulling movement, the drug package is moved over the end portion with an arcuate front. How exactly the drug package is grasped depends on the exact design of the transport device. According to the disclosure, the term transport device is intended to cover all devices with which a drug package can be moved from the storage surface onto the tray table. For example, it is conceivable that the transport device is designed as a suction arm or includes such, by means of which a drug package is pulled onto the tray table.

In the gripper according to the disclosure, at least one sensor coupled to a control device is arranged in the end portion below the support surface, which sensor can determine the presence of a drug package in its detection area. The aforementioned control device may be part of the gripper itself, but it may also be arranged at a different location of the picking device. Due to the arrangement of the sensor in the end portion and below the support surface, any sensor can be used, which can detect the presence of an object. The sensor may, for example, operate on the principle of a light scanner, a light sensor or a tactile sensor, the exact configuration of the sensor for the disclosure is not essential, as long as it is ensured that the sensor can detect the presence of a piece good in the end portion in the inventive arrangement.

With the gripper according to the disclosure, it is also possible to detect such incorrect movements or the removal of drug packages, in which the drug package thus remains hanging in the transition area storage location/tray table, so that the package rests only in the end portion of the tray table. If one were to use a light barrier in such a case, which can be arranged only in the parallel portion of the tray table, such an incorrect removal would not be detected. However, the use and arrangement of at least one sensor below the support surface according to the disclosure makes such a detection possible. The use of an aforementioned sensor has the additional advantage that it is less expensive than a light barrier.

If in this application a drug package is mentioned, where it makes sense technically, several drug packages should also be included. Thus, it is possible with appropriate arrangement of the drug packages to move several drug packages from a storage location onto the tray table.

As stated above, the transport device can be designed, for example, as a suction arm or comprise such. Although such a design is structurally quite simple, a movement of several drug packages simultaneously from a storage surface onto the tray is not, and a movement of very heavy drug packages is possible only with difficulty. In one or more embodiments of the suction gripper according to the disclosure, it is therefore preferred that the transport device comprises two elongated clamping jaws, extending in the X-direction and with clamping surfaces facing one another, wherein at least one of the clamping jaws is additionally movable at least in sections in the second horizontal direction. In one or more embodiments of the transport device, several drug packages can be moved simultaneously. Furthermore, heavier drug packages can be moved when applying a corresponding clamping force. The use of clamping jaws also has the advantage of being able to guide the drug packages in the event of movement of drug packages from the tray table to a storage surface or delivery location. Furthermore, such a gripper can be used to move drug packages on a storage surface along the second horizontal direction.

Drug packages are moved onto the tray table such that they are moved over the longitudinal or central axis of the tray table, so that it is sufficient to arrange a sensor in the central region of the end portion. In unfavorable cases, however, a drug package may become wedged in such a way during movement onto the tray table that it rests only in an outer region of the end portion. Therefore, in one or more embodiments of the gripper according to the disclosure it is provided that a plurality of sensors is arranged for determining the presence of a drug package in the end portion, wherein the sensors are arranged in the Y-direction spaced apart in the end portion below the support surface.

The sensors serve, as stated above, to detect whether a drug package has become stuck in the end portion of the tray table when moving onto the tray table. In addition, however, it is also possible to use the sensors for a plausibility check with respect to the removed drug package, by using the sensors to determine the approximate width of the drug package being pulled over the end portion onto the tray table. To make this possible, it is provided in one or more embodiments of the gripper according to the disclosure that the plurality of sensors are arranged mirror-symmetrically with respect to a center axis of the tray table extending in the X-direction. Based on the knowledge of the mirror-symmetrical arrangement of the sensors, it is easily possible to conclude the approximate width of the drug package moved onto the tray table. Depending on the number of sensors, the "resolution" can be increased during the plausibility check.

As already stated, the end portion is formed arcuately in the gripper according to the disclosure. In order to ensure that the gap between the front and the storage location of a drug package is particularly small, it is provided in one or more embodiments that the arcuate front of the end portion is circularly arcuate, wherein the center of the corresponding circle is located in a vertical axis of rotation of the tray table.

In order to avoid a long downtime of the gripper in case of failure of a sensor or multiple sensors, it is provided in one or more embodiments that the end portion comprising at least one sensor is formed as sensor assembly detachable from the tray table. A corresponding design as a sensor assembly allows for rapid replacement, possibly also by a "normal" operator.

It is essential in the gripper according to the disclosure that the clamping jaws are movable in the X-direction, which means that the clamping jaws are movable from the tray table to a storage location and back again, the X-direction regularly corresponding to the longitudinal axis of the tray table. In order to ensure the clamping or gripping of a drug package, it is also necessary that at least one of the clamping jaws is movable in the Y-direction. To make the gripping of a drug package particularly effective and efficient, it is advantageous that both clamping jaws are movable in the Y-direction and at least one is also designed to be pivotable.

To achieve this, it is provided in one or more embodiments of the gripper that the gripper has a jaw guide assembly for performing the aforementioned movements. This jaw guide assembly comprises a frame structure, at least a first and a second guide extending parallel and in the first horizontal direction spaced from each other in the second horizontal direction, and at least four jaw carriages coupled to the guides and driven in the second horizontal direction, wherein two first jaw carriages are associated with the first guide and two second jaw carriages are associated with the second guide, and wherein at least two jaw carriages spaced in the first horizontal direction are coupled to a clamping jaw. A drive unit is further coupled with the jaw guide assembly, with which drive unit the jaw guide assembly is driven in the first horizontal direction. The use of the combination of the guides with jaw carriages makes it possible to move the clamping jaws evenly toward or away from each other and at the same time pivot one of the clamping jaws when the jaw carriages are not moved simultaneously on the first and second guides. One or more embodiments of the movement mechanism of the clamping jaws has the further advantage that due to the guiding of the clamping jaws, a significant clamping force can be applied to drug packages to be moved.

The above object is further achieved by a method for verifying a movement of drug packages onto a tray table of a gripper for a picking device. In the method according to the disclosure, in a step a), the transport device is moved in the X-direction to a storage location of at least one drug package and the at least one drug package is gripped. The storage location may be, for example, a shelf surface. Alternatively, the storage location can also be formed by, for example, a conveyor belt from which the drug package is gripped in order to move it to a shelf surface. After grasping the drug package, the transport device is moved in step b) from the storage location in the X-direction to the tray table, wherein the at least one drug package is moved over the arcuate front of the end portion to the support surface of the tray table.

After moving the transport device in the X-direction, it is checked in a step c) by means of the at least one sensor in the end portion whether a drug package is present in the detection area of the sensor. If this is the case, it means that at least a portion of a drug package rests in the end portion of the tray table, indicating an incorrect movement of a drug package from a storage location onto the tray table. If the test is positive, a signal is provided in a step d), which indicates a first incorrect removal attempt of a piece good from a storage location onto the tray table.

Providing a signal indicative of a first incorrect withdrawal attempt may result in the picking device being shut down until the error is corrected by an operator. In one or more embodiments of the method for verifying a movement of drug packages onto a tray table of a gripper, wherein the transport device comprises two elongated X-directionally extending clamping jaws arranged above the tray table, with clamping surfaces facing each other, the device is not completely shut down, but rather the clamping jaws are opened in the Y-direction and again moved in the X-direction to the storage location, and then the drug package disposed in the end portion is gripped with the clamping jaws. Since it is known on the basis of the check that the drug package is disposed at least in sections in the end portion of the tray table, it can be estimated on the basis of the information present on the package how far the movement must take place in the X-direction. After the drug package has been gripped (or one has at least tried to grip it) with the clamping jaws, the above-mentioned process steps b) and c) are performed again, i.e. the package is returned to the tray table and an end portion test is performed. Should the second check of the end portion also be positive, i.e. should it be determined that a drug package is again resting on the end portion, a signal indicative of a second incorrect withdrawal attempt is provided. In response, the device can now be shut down, or a third removal attempt may also be carried out.

In one or more embodiments of the method according to the disclosure, in which a plurality of sensors are arranged in the end portion, the width of a drug package is determined by moving the at least one drug package toward the tray table by means of the plurality of sensors arranged in the tray table, the determined width is compared to a nominal width known to the control device and, when a limit deviation between the determined width and target width of a drug package is exceeded, a corresponding signal is provided. Therefore, there is a further verification of the moved drug package. While it is relatively unlikely that a drug package which the control device of the picking device does not expect would be located at a storage location, this may be the case if, for example, an error correction by an operator has displaced the drug packages in the picking device. The embodiments according to the disclosure thus once again increases the certainty that the correct drug package is removed.

The response to the provided signal indicative of an improper drug package may be that the picking device is stopped due to the unexpected drug package. Alternatively, it can be provided in one or more embodiments that, after providing a signal indicative of an exceeding of a limit deviation, the gripper is moved towards an unloading station and the drug packages resting on the tray table are transferred to the unloading station. This avoids that a user must enter the picking device in the case of a detected improper depositing, which avoids a standstill of the picking device. The thus removed drug packages can be loaded again and the drug to be initially unloaded can be requested again.

The disclosure further relates to a use of a sensor assembly having an arcuate side surface and at least one sensor arranged below the surface of the sensor assembly, which can determine the presence of a drug package in its detection area, and an interface for connecting the sensor assembly to a control device for verifying a movement of drug packages on a support table of a gripper of a picking device for drugs.

Figure 1B:
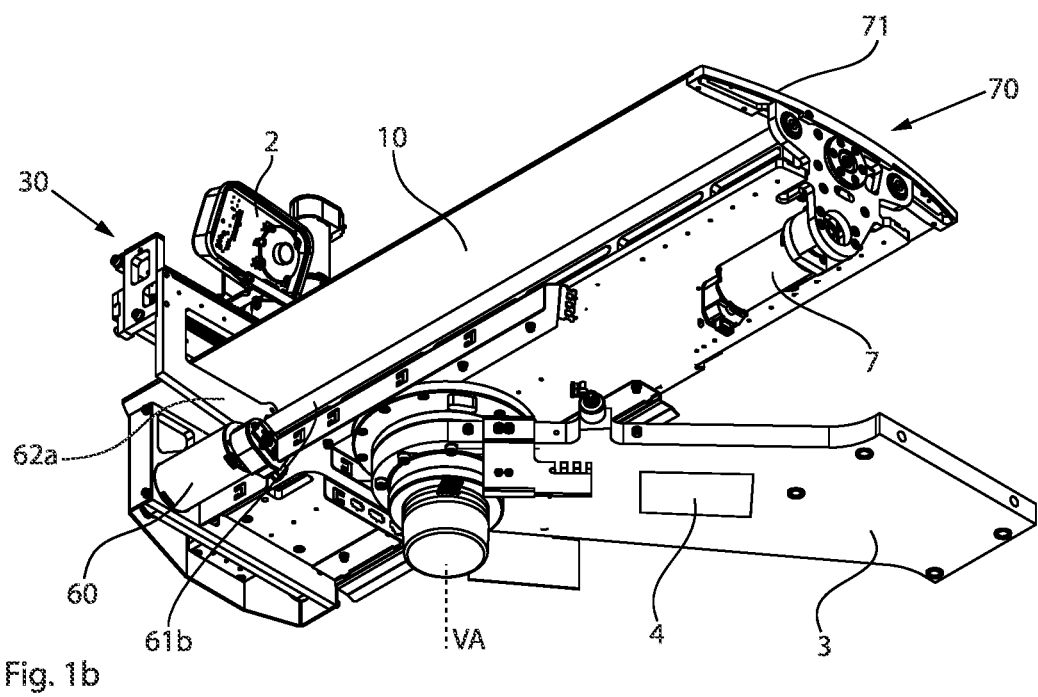

FIGS. 1a and 1b show two oblique views of one or more embodiments of a gripper 1 according to the disclosure, wherein FIG. 1a shows an oblique view from above and FIG. 1b shows an oblique view from below. The gripper 1 according to the disclosure is part of an operating device (not shown) for a picking device and includes a tray table 10 and a transport device that includes two clamping jaws 20a, 20b with opposite clamping surfaces 21a, 21b (see FIG. 5b). At their free ends, the clamping jaws 20a, 20b have a portion 22a, 22b (see FIG. 4a), which is coated with an anti-slip material.

At the free ends of the clamping jaws 20a, 20b, the tray table 10 has an end portion 70, which is a sensor assembly 72 having a plurality of sensors 73 disposed below the surface of the sensor assembly 72 and capable of detecting the presence of an object in their detection area. In the present case, the sensors 73 can detect when a drug package (at least in sections) rests in the end portion 70. The end portion forms the loading and unloading front of the tray table 10, and together with the tray table 10, the end portion 70 forms a support surface on which drug packages rest or move. A front 71 of the end portion 70 is arcuate. This is necessary with correspondingly wide tray tables 10 if they are only to be pivoted to approach a storage location and not additionally moved in the X-direction towards the storage location and a gap between front and storage location should be kept as small as possible. Here, the end portion 70 is formed as a detachable sensor assembly 72 which is coupled with a control device 4 (shown in FIG. 1b).

The tray table 10 includes, in the middle, an elongated opening 11 which extends in the direction of loading and unloading, i.e. in the first horizontal direction X. In the opening 11, a sliding element 12 is arranged with a widened sliding head 13. The sliding element 12 can be moved in the elongated opening 11 in the loading and unloading direction and the first horizontal direction X.

Opposite the end portion 70, a jaw guide assembly 30 is arranged to which the clamping jaws 20a, 20b are connected and which includes a mechanism for moving and pivoting the clamping jaws 20a, 20b. In an upper section, the jaw guide assembly 30 includes a drive unit 50 with two drives 51, 52 and associated gears 53, 54. The clamping jaws 20a, 20b are moved and pivoted by way of these two drives 51, 52, as will be described in more detail with reference to the following figures. The jaw guide assembly 30 further includes an optical detection device 2, with which various aspects can be monitored during the loading and unloading operation.

The jaw guide assembly 30 and all of its electronic components are connected to a control device 4, which is arranged below an attachment arm 3. The attachment arm 3 itself is fastened to the tray table 10 or to a substructure of the tray table via a swivel joint.

For loading and unloading of drug packages, the jaw guide assembly 30 must be moved in the first horizontal direction (X-direction) or the loading and unloading direction. For this purpose, a drive 60 is arranged below the tray table, by which the jaw guide assembly 30 is moved, as will be described in more detail with reference to subsequent figures. Moreover, below the tray table 10, a further drive 7 is arranged, with which the sliding element 12 is movable in the elongated opening 11 in the first horizontal direction X.

Figure 2A:
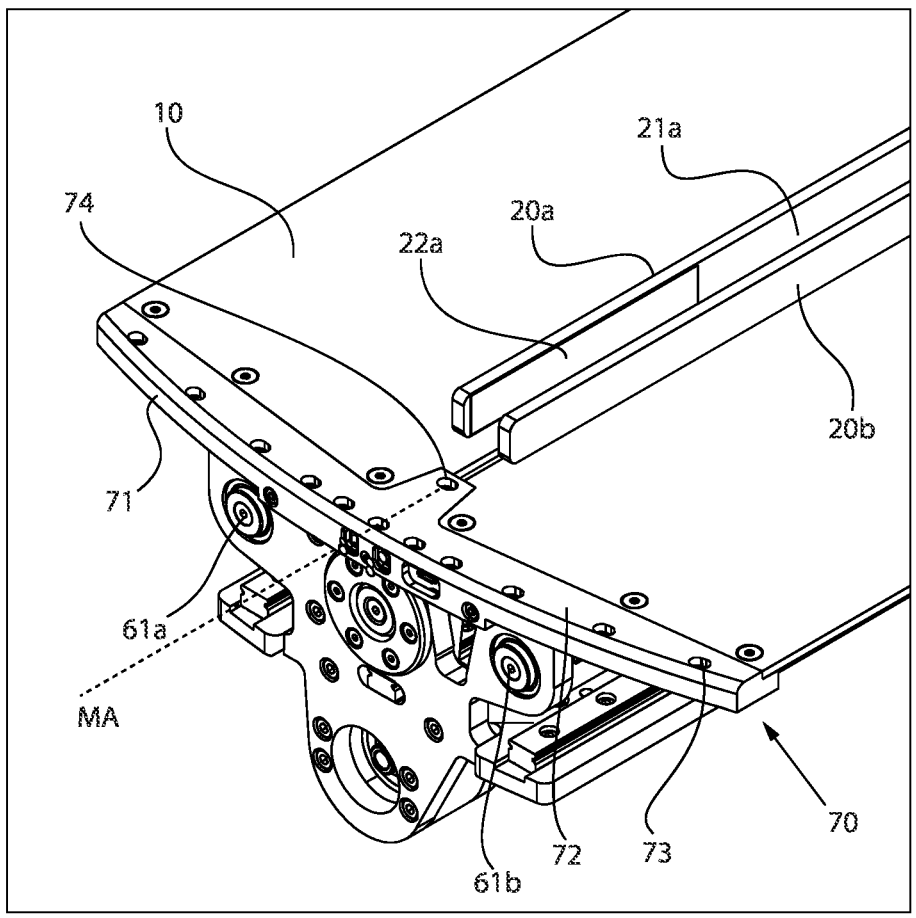
FIG. 2a is a perspective view of the gripper of FIG. 1a in the region of the end portion of the tray table.
Figure 2B:
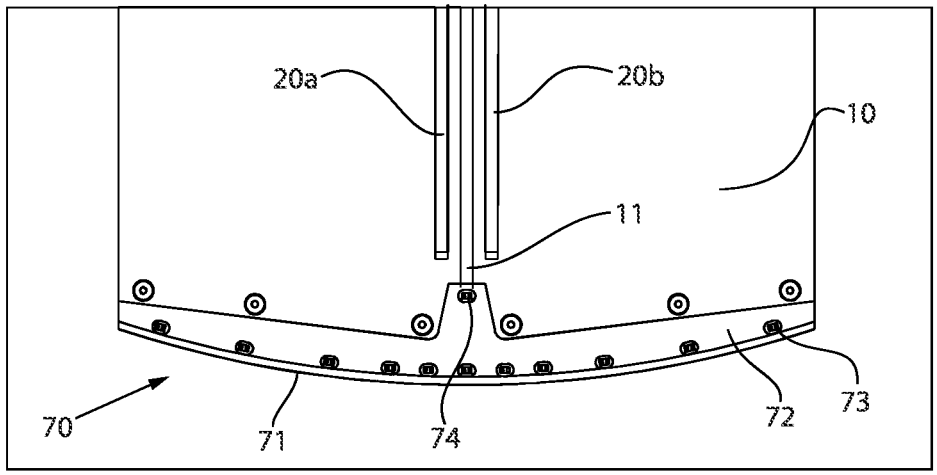
Figure 3A:
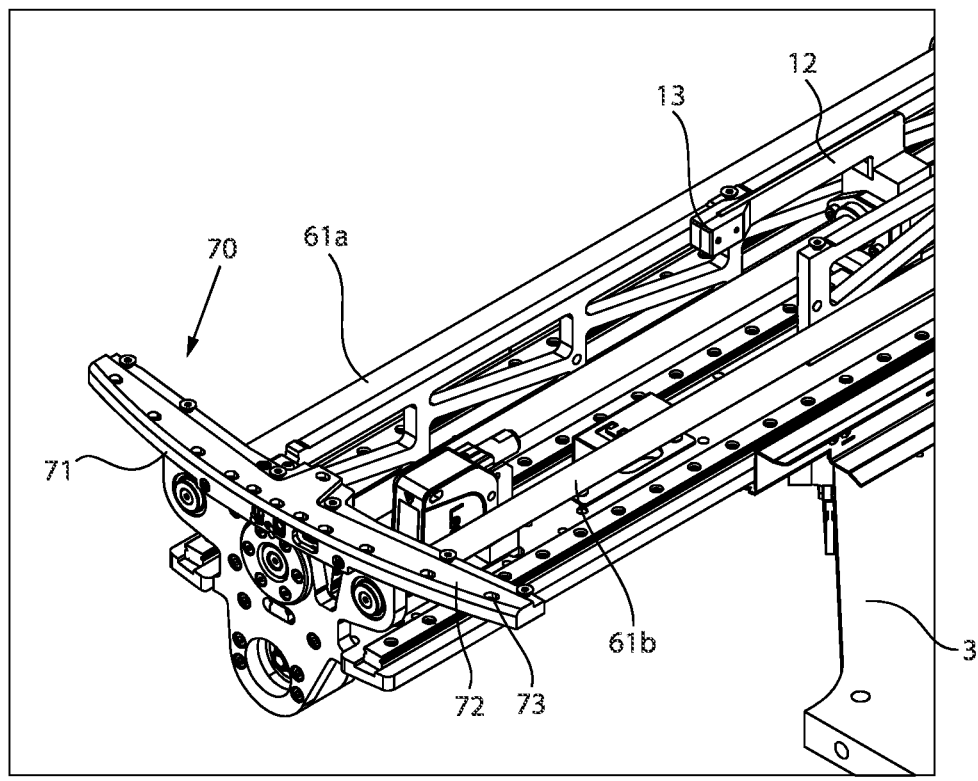
FIGS. 3a and 3b are perspective and tope plan views of FIGS. 2a and 2b without a tray table.
Figure 3B:
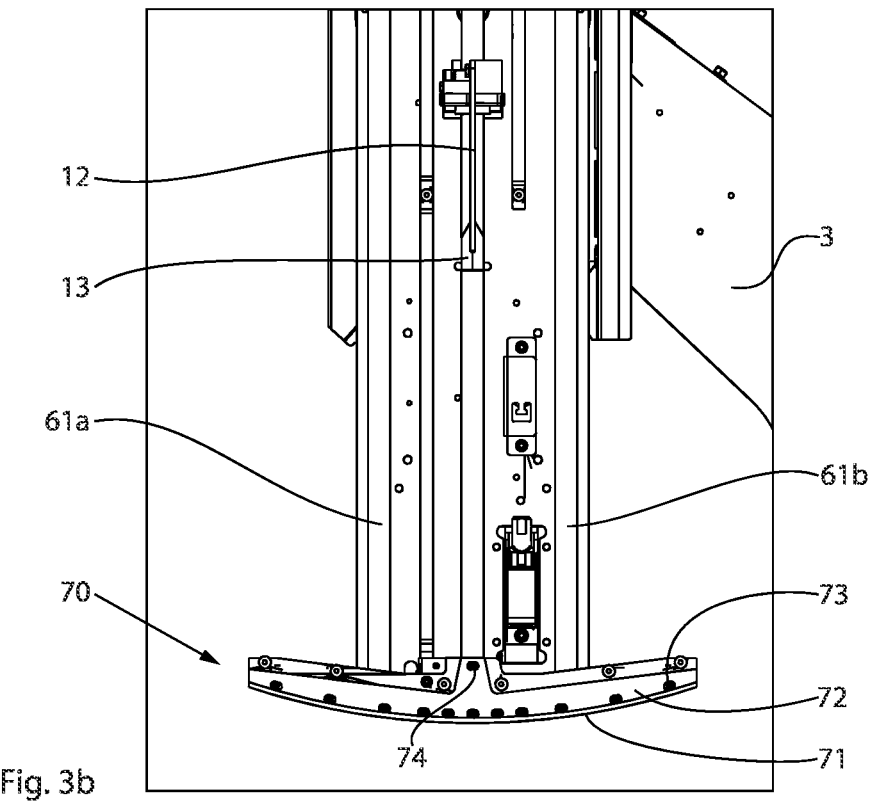

FIGS. 2a, 2b and 3a, 3b show detailed views of the gripper 1 in the region of the end portion 70 of the tray table 10, wherein in FIGS. 3a and 3b, the tray table is omitted to illustrate the lower part of the gripper 1. FIGS. 2a and 2b show the arrangement of the sensors 73, which are arranged mirror-symmetrically with respect to the central or longitudinal axis MA of the tray table 10 of the gripper 1. The sensor assembly 72 comprises, in addition to the sensors 73, a sensor 74 which is formed corresponding to the sensors 73 and which can serve to determine the length, in the X-direction, of the drug package(s) moved onto the tray table 10. For this purpose, the drug package is moved when moving on the tray table 10 completely to the sliding head 13, by the clamping jaws 20a, 20b being completely moved back. Upon contact with the sliding head 13, the drug package is moved toward the end portion 70 until the sensor 74 is activated. Based on the movement distance, the length in the X-direction can be determined and compared with the known length.

Figure 4A:
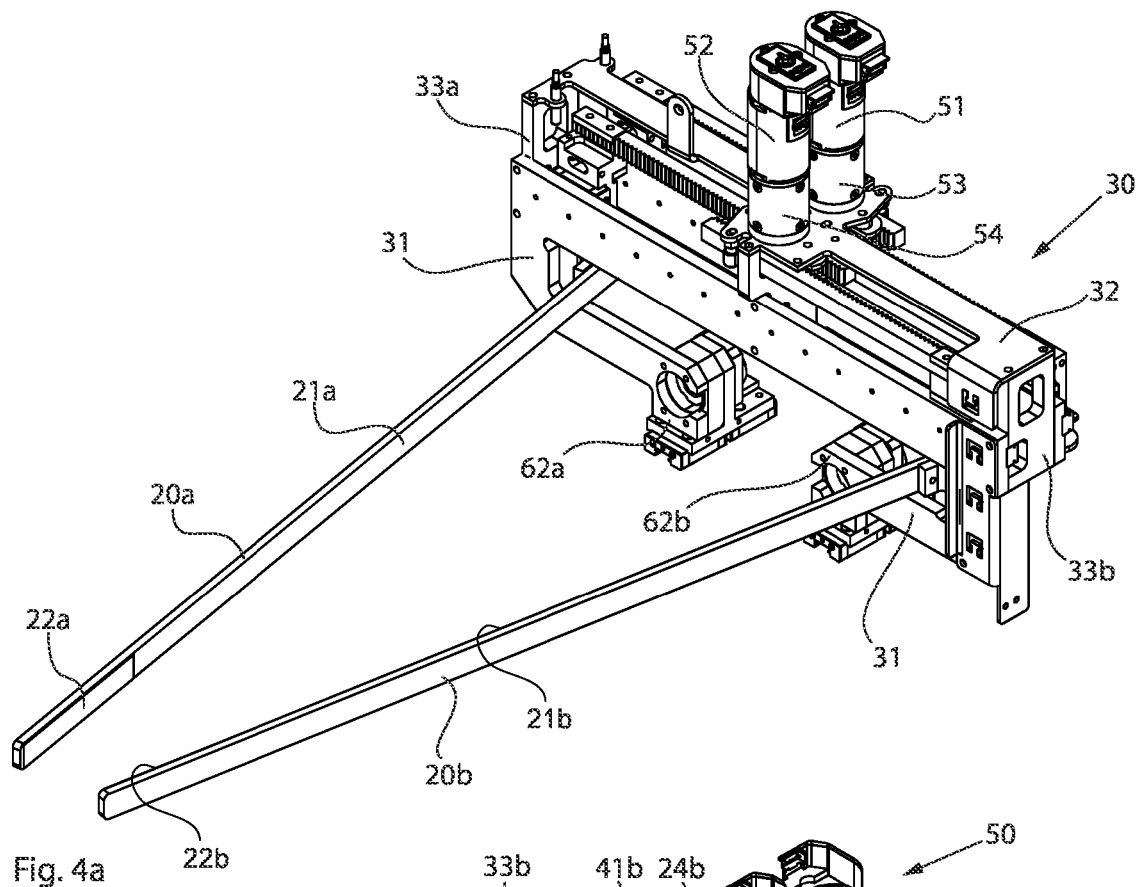
FIGS. 4a and 4b are perspective views of a jaw guide assembly of a gripper according to the disclosure.
Figure 4B:
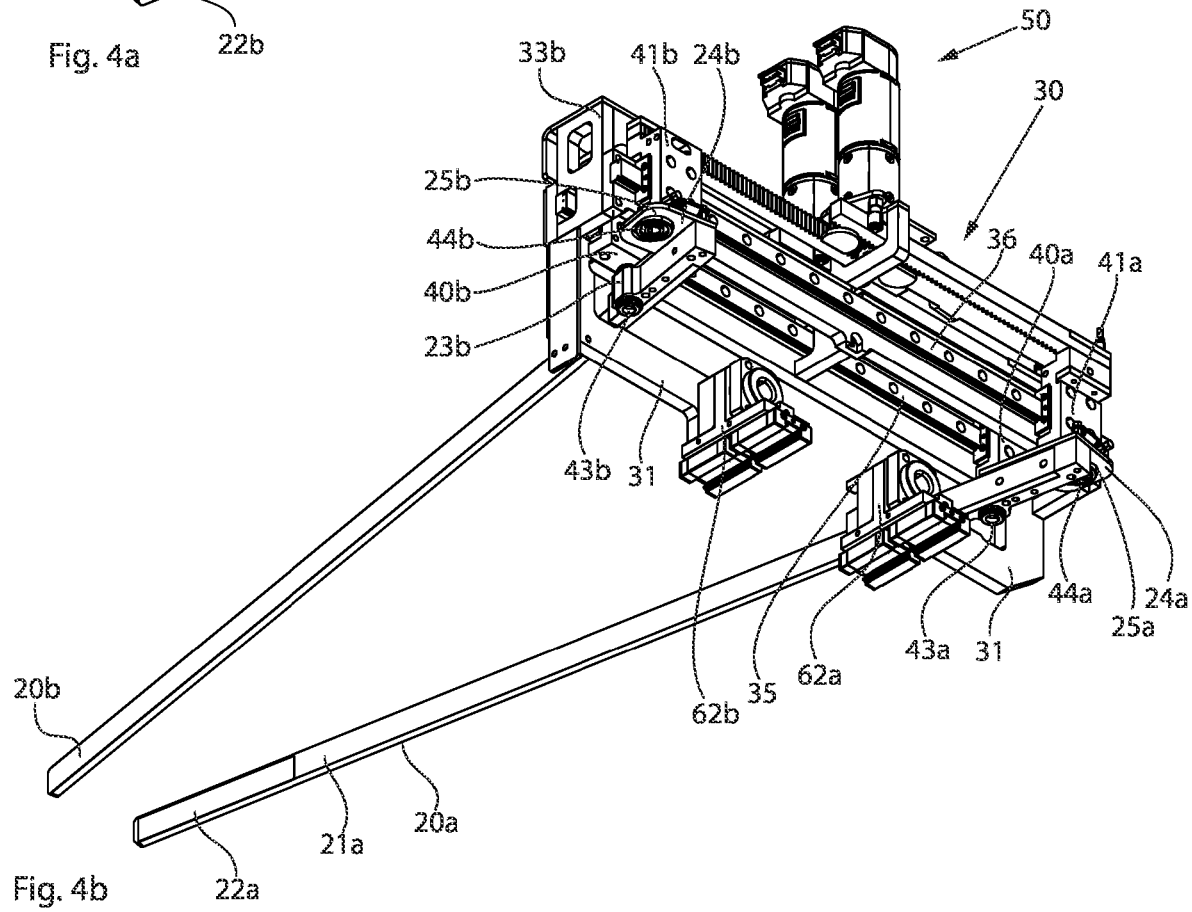

FIGS. 4a and 4b show oblique views of a jaw guide assembly 30 of one or more embodiments in which both clamping jaws 20a, 20b are pivoted for grasping. The jaw guide assembly 30 includes a slightly different frame structure 31, 32, 33a, 33b, wherein the front component 31 engages around the clamping jaws 20a, 20b and the tray table 10 (not shown). At the lower ends of the component 31, movable parts 62a, 62b (the "runners") of a linear drive are mounted with which the jaw guide assembly 30 can be moved in the first horizontal direction. The components are referred to as being "movable" as they move together with the jaw guide assembly 30 along corresponding fixed parts 61a, 61b, which are rotated to move the moving parts 62a, 62b, in the first horizontal direction X. The fixed parts 61a, 61b (see also FIGS. 1a, 1b, 2a, 3a and 3b) themselves may move to move the moving parts 62a, 62b, for example by rotating, during which rotating movement the moving parts 62a, 62b are moved along the longitudinal axis of the fixed parts 61a, 61b. The fixed parts 61a, 61b are therefore only fixed in relation to their position within the operating device itself. In one or more embodiments, it is conceivable, for example, that the fixed parts are designed as toothed belts, which are formed between the longitudinal ends of the operating device and cooperate with corresponding deflection rollers for moving the movable parts 62a, 62b.

As can be seen in FIG. 4b, a first guide 35 and a second guide 36 extend between the lateral frame structure components 33a, 33b in a second horizontal direction Y parallel to one another and spaced apart in the first horizontal direction X, wherein the first guide 35 faces the free ends of the clamping jaws 20a, 20b. Jaw carriages 40a, 40b; 41a, 41b are arranged on each of the guides 35, 36, with two first jaw carriages 40a, 40b on the first guide 35 and two second jaw carriages 41a, 41b on the second guide 36. A portion of the jaw carriages 40a, 40b; 41a, 41b surrounds a projection of the guides 35, 36, so that the jaw carriages 40a, 40b; 41a, 41b partially rest on this projection.

Figure 5A:
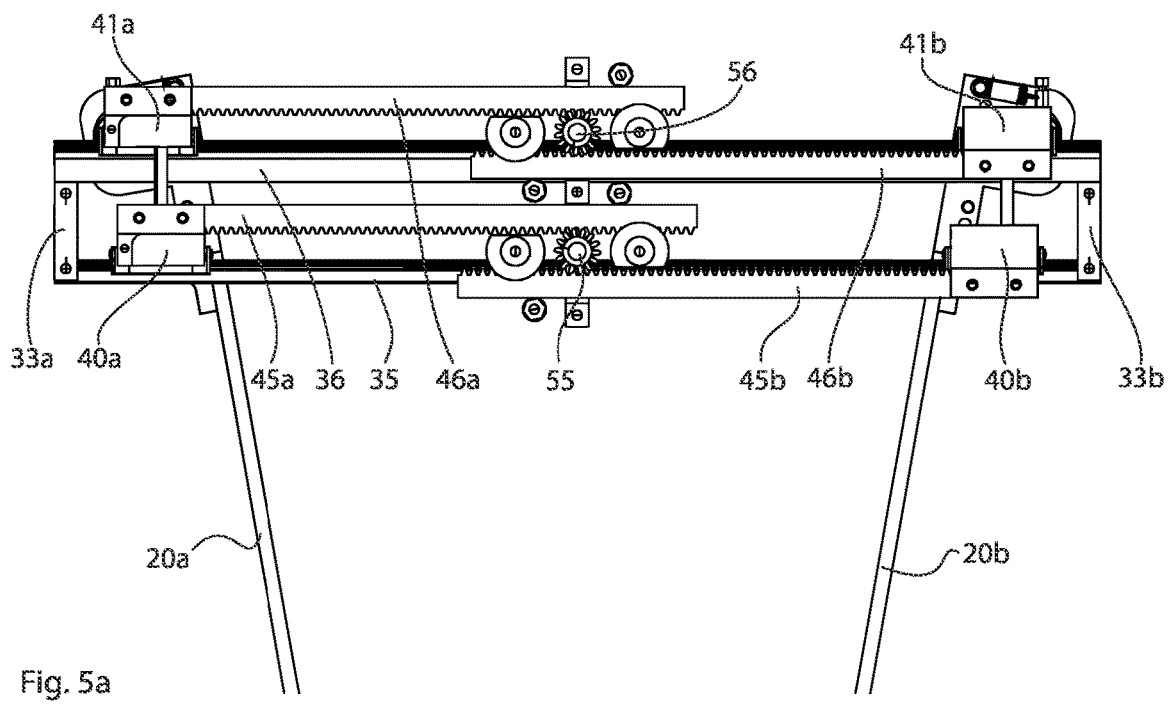
FIGS. 5a and 5b are bottom and top plan views of the jaw guide assembly of FIGS. 4a and 4b.
Figure 5B:
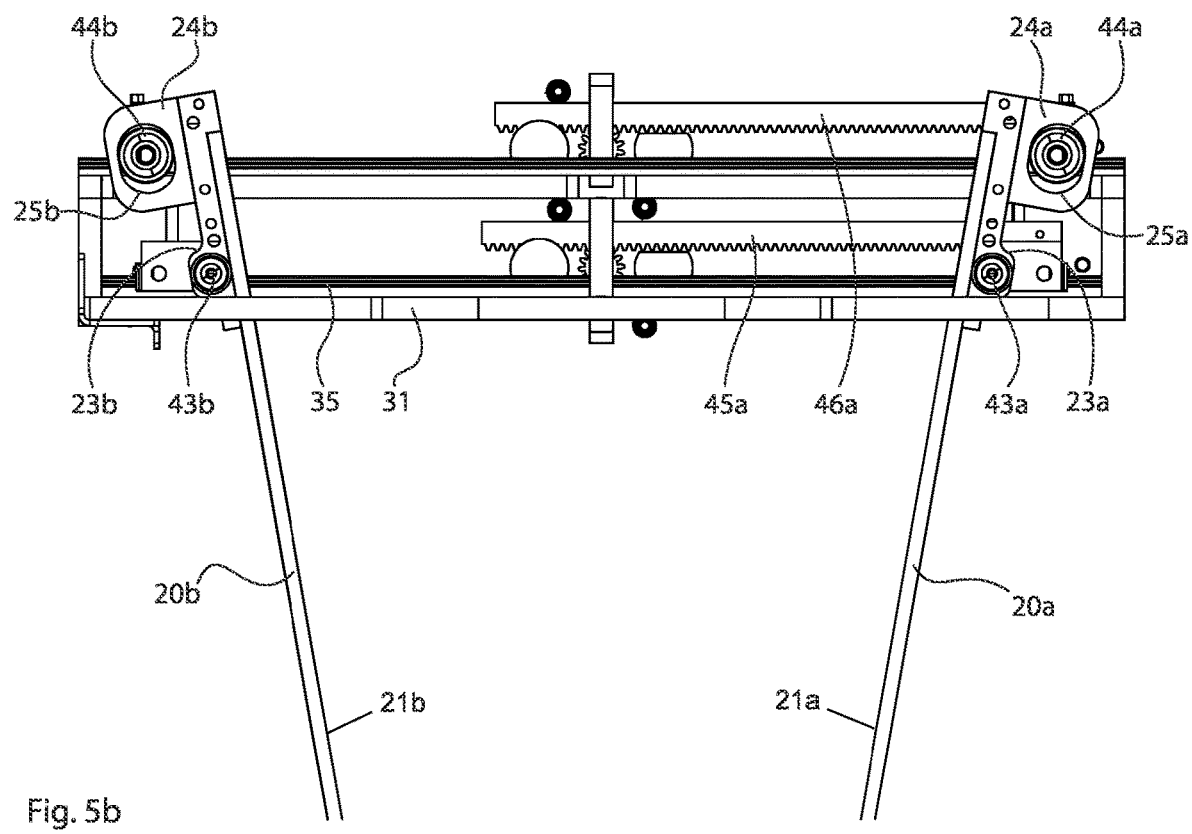

FIGS. 5a and 5b show detailed views of the jaw assembly 30. It can be seen from these figures that jaw carriages 40a, 40b; 41a, 41b are connected with drive elements 45a, 45b, 46a, 46b, which are formed as racks. The drive elements 45a, 45b associated with the first guide 35 and the corresponding first jaw carriage 40a, 40b and the corresponding drive elements 46a, 46b associated with the second guide 36 are aligned with respect to the tooth elements of the racks in such a way that the toothed elements lie opposite one another and at their free ends form an overlap area. A drive gear (e.g., gearwheel) 55, 56 is arranged in each case centrally in the overlapping region of the drive elements or racks and is coupled to a drive 51, 52 via a gear 53, 54 (not shown in FIGS. 5a and 5b). The distance between the jaw carriages 40a, 40b; 41a, 41b of a guide 35, 36 and the corresponding drive gear 55, 56 is identical, a drive gear 55, 56 is thus arranged exactly in the middle between two jaw carriages 40a, 40b; 41a, 41b, so that a movement of the drive gear 55, 56 causes synchronous movements of the jaw carriages 40a, 40b; 41a, 41b. Upon rotation of the drive gear 55, 56, the jaw carriages 40a, 40b; 41a, 41b are thus synchronously moved toward or away from each other, with the corresponding applying for the jaw carriages 40a, 40b; 41a, 41b associated with the two guides 35, 36.

Thus, the jaw carriages 40a, 40b of the first guide can be moved simultaneously or separately with respect to the jaw carriages 41a, 41b of the second guide, so that there is great flexibility in the movement of the jaw carriages 40a, 40b; 41a, 41b. The jaw carriages 40a, 40b; 41a, 41b of the first and second guides 35, 36 may be moved synchronously, or only the jaw carriages 40a, 40b; 41a, 41b associated with the first or second guides 35, 36 may be moved. In this way, it is possible to simultaneously move the clamping jaws 20a, 20b attached to the jaw carriage 40a, 40b; 41a, 41b parallel or already pivoted without angular adjustment (by simultaneously moving the jaw carriages 40a, 40b; 41a, 41b of both guides 35, 36) or, if only the jaw carriages 40a, 40b; 41a, 41b of a guide 35, 36 are moved, to pivot the jaws.

As already stated, the clamping jaws 20a, 20b are coupled to the jaw guide assembly 30. This coupling can be seen in FIGS. 4b and 5b. The clamping jaws 20a, 20b are each connected via a pivot 23a, 43a; 23b, 43b with the jaw carriages 40a, 40b of the first guide 35 and via a slot guide 24a, 25a, 44a; 24b, 25b, 44b are connected to the jaw carriages 41a, 41b of the second guide 36. In one or more embodiments, a hinge may also be arranged in the jaw carriage 41a, 41b associated with the second guide 36, and in this case, it is then required in the illustrated combination that the slot guides are arranged in the jaw carriages 40a, 40b associated with the first guide 35.

However, a use of the combination rotary joint/slot guide is not mandatory. Although the clamping jaws 20a, 20b must be kept in at least one guide to the corresponding jaw carriage 40a, 40b; 41a, 41b by a rotary or swivel joint, the use of a slot guide is not mandatory. Thus, it is conceivable, for example, that the clamping jaws 20a, 20b are moved in one or more embodiments with the jaw carriages 40a, 40b; 41a, 41b against a resetting force, and when returning the jaw carriage 40a, 40b; 41a, 41b, the resetting force moves the clamping jaws 20a, 20b back.

Figure 6:
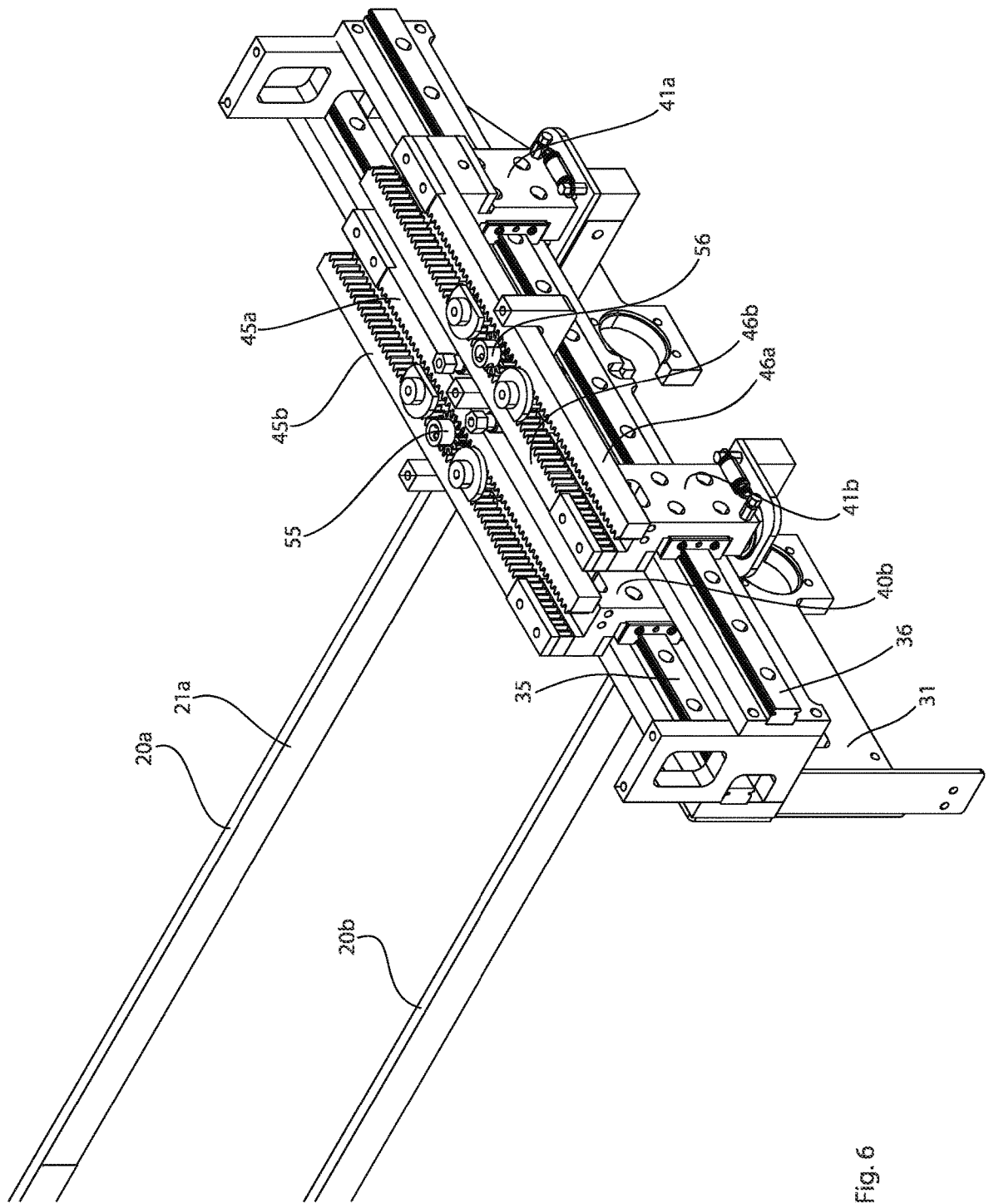
FIG. 6 is a perspective view of the jaw guide assembly of FIGS. 4a and 4b when the clamping jaws are in parallel position.
Figure 8:
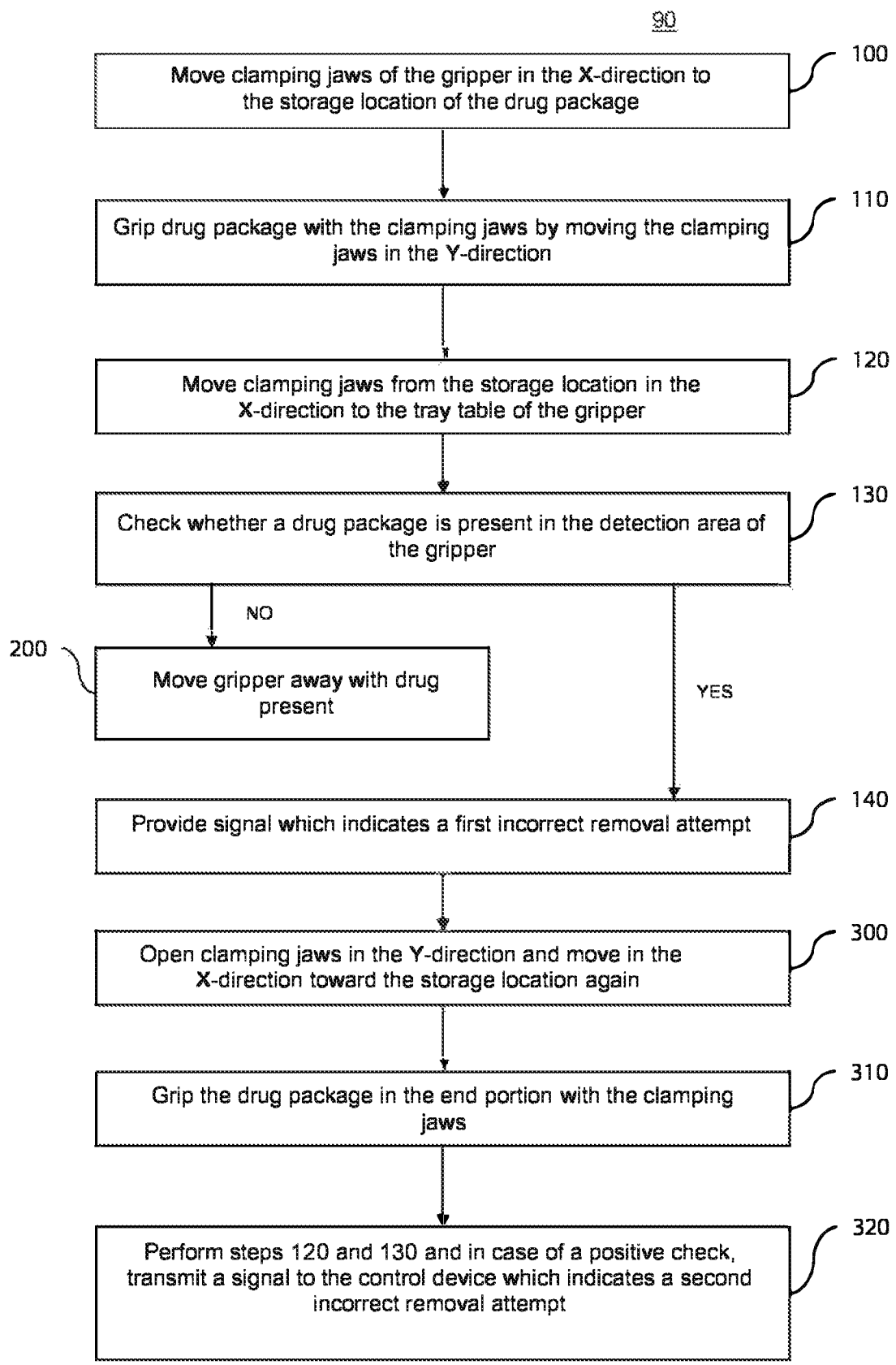
FIG. 8 is a flow chart of one or more embodiments of a method for operating a picking device having a gripper according to the disclosure.

FIG. 6 shows a detailed view of the jaw guide assembly 30, wherein parts of the drive unit 50 and the frame structure are omitted for a better view of the remaining components. In FIG. 6, the clamping jaws 20a, 20b are further moved together and aligned parallel to each other. In a comparison of FIGS. 5a, 5b and FIG. 6 it can be seen how the position of the clamping jaws 20a, 20b is influenced by a displacement of the jaw carriage 40a, 40b; 41a, 41b on the guides 35, 36.

With reference to FIGS. 7a-7h and FIG. 8, one or more embodiments of a method 90 according to the disclosure will now be described. First, the gripper 1 is moved to a storage location 80 such that the drug packages 6', 6 to be removed are arranged approximately centrally with respect to the tray table 10 of the gripper 1, as illustrated in FIG. 7a. In FIGS. 7a-7h, only a few components of the gripper 1 are shown schematically which are essential for the method as such. In addition to the clamping jaws 20a, 20b, the sliding head 13 is illustrated, which represents a stop for the drug packages 6', 6 when pulling them onto the tray table 10. As indicated in the figures, the tray table 10 comprises an end portion which is circularly arcuate in the Y-direction and in which a plurality of mirror-symmetrically arranged sensors 73 are arranged. The tray table 10 itself is brought into position by pivoting the tray table 10 about a vertical axis VA in front of the storage location 80.

To move drug packages 6', 6 toward the tray table 10, first the clamping jaws 20a, 20b of the gripper 1 are moved in the X-direction to the storage location 80 of the drug packages 6', 6, as illustrated in FIG. 7b (step 100). As soon as the clamping jaws 20a, 20b are moved correspondingly far to the storage location, they are moved towards each other in the Y-direction, so that the drug packages 6', 6 are gripped (see also FIG. 7b, step 110). Once the drug packages 6', 6 are gripped, in a step 120, the clamping jaws 20a, 20b are moved from the storage location 80 in the X-direction to the tray table 10 of the gripper 1, which is illustrated in FIG. 7c. In order to move the drug packages 6', 6 onto the tray table 10, the clamping jaws 20a, 20b are moved in the X-direction to their original position, with the gripped drug package or packages 6', 6 striking the sliding head 13.

Once the complete return movement of the clamping jaws 20a, 20b has been performed, it is checked in a step 130 whether a drug package 6', 6 is present in the detection area of one of the sensors 73. The detection as to whether a drug package 6', 6 is arranged in the end portion depends on the type of sensor 73 used, meaning particularly light scanners, light sensors and tactile sensors. How exactly the presence of an object is detected as a function of the specific type of sensor is known to the person skilled in the art and will not be explained in more detail here.

If the check reveals that no drug package 6', 6 is lying in the end portion, the gripper 1 is moved subsequently to the storage location 80 of the drug package or packages 6', 6 resting on the tray table 10 (step 200).

However, if it turns out that a drug package 6', 6 is disposed in the end portion, as shown in FIG. 7d, a signal is provided which indicates a first incorrect removal attempt of the drug package 6', 6 from the storage location 80 to the tray table 10 (step 140). In the situation illustrated in FIG. 7d, it is the case that the drug package 6' has not been moved completely onto the tray table 10, but is still arranged largely at the storage location 80, but also partly arranged in the end portion. If the gripper 1 would be moved in this situation, it could happen that the drug package 6' falls from the storage location 80 and, in the worst case, blocks subsequent movement operations of the operating device. For example, the signal provided could cause gripper 1 operation not to be possible and operator intervention to be necessary.

It is also conceivable that this signal initiates a second removal attempt using the gripper 1. For this purpose, in a step 300, the clamping jaws 20a, 20b are opened in the Y-direction and moved in the X-direction to the storage location 80. Here, a plurality of sensors 73 are used in the end portion, so that the control device 4 can use the activated sensors 73 to evaluate how far the clamping jaws 20a, 20b have to be moved apart in the Y-direction. If only a smaller number of sensors 73 are used, the procedure is simply to move the clamping jaws 20a, 20b maximally in the Y-direction. Once the clamping jaws 20a, 20b have been moved correspondingly far in the X-direction to the storage location, an attempt is made to grasp the stuck drug package 6' with the clamping jaws 20a, 20b (step 310) by retracting the clamping jaws 20a, 20b in the Y-direction. Thereafter, process steps b) and c), that is, moving in the X-direction toward the tray table 10 and checking the end portion for a resting drug package, are repeated (step 320). If it is determined that a drug package 6', 6 is still resting in the end portion, a signal indicative of a second incorrect removal attempt is provided (FIG. 7h). In this case, a third removal attempt may be made, or a movement of the gripper 1 is prevented and the intervention of operating personnel is requested.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A gripper for drug packages, the gripper comprising:
a tray having an end portion with an arcuate front, the end portion forming a loading and unloading front;
a transport device arranged above the tray, the transport device configured to move drug packages from a storage surface onto the tray; and at least one sensor arranged in the end portion of the tray, the at least one sensor configured to determine a presence of a drug package in a detection area of the at least one sensor.

2. The gripper of claim 1, wherein the transport device comprises two elongated clamping jaws with clamping surfaces facing each other.

3. The gripper of claim 2, wherein at least one of the two elongated clamping jaws is movable at least in sections towards and away from the other one of the two elongated clamping jaws.

4. The gripper of claim 2, further comprising:
a jaw guide assembly comprising:
a frame structure,
a plurality of guides extending in parallel in a first direction and spaced from each other in a second direction, and
a plurality of jaw carriages coupled to the guides and driven in the second direction, wherein at least one of the plurality of jaw carriages are arranged on each of the plurality of guides; and
a drive unit coupled to the jaw guide assembly, the drive unit configured to drive the jaw guide assembly in the first direction.

5. The gripper of claim 4, wherein the plurality of guides comprises a first guide and a second guide, and wherein the plurality of jaw carriages comprises at least four jaw carriages, wherein two first jaw carriages are coupled to the first guide and two second jaw carriages are coupled to the second guide.

6. The gripper of claim 5, wherein at least two of the plurality of jaw carriages are spaced apart in the first direction and are coupled to one of the two clamping jaws.

7. The gripper of claim 1, wherein the gripper comprises a plurality of sensors for determining the presence of a drug package, wherein the sensors are arranged spaced apart from each other in the end portion and positioned below a support surface for drug packages.

8. The gripper of claim 7, wherein the sensors are arranged mirror-symmetrically with respect to a central axis of the tray.

9. The gripper of claim 1, wherein the end portion comprising the at least one sensor is formed as a sensor assembly configured to be detachable from the tray.

10. The gripper of claim 1, wherein the arcuate front of the end portion is circularly curved, wherein the center of a corresponding circle is located in a vertical rotary axis of the tray.

11. The gripper of claim 1, further comprising an attachment arm coupled to the tray via a swivel joint.

12. The gripper of claim 11, further comprising a control device arranged on the attachment arm, the control device coupled to the at least one sensor.

13. The gripper of claim 1, further comprising a sliding element comprising a sliding head movably disposed in an elongated opening of the tray.

14. A system for drug packages, the system comprising:
a storage location configured to store one or more drug packages; and
a picking device comprising a gripper, the gripper comprising:
a tray having an end portion with an arcuate front, the end portion forming a loading and unloading front;
a transport device arranged above the tray, the transport device configured to move drug packages from the storage location onto the tray; and
a sensor assembly arranged in the end portion of the tray, the sensor assembly configured to determine a presence of a drug package in a detection area of the sensor assembly.

15. The system of claim 14, wherein the sensor assembly comprises a plurality of sensors arranged spaced apart from each other in the end portion and positioned below a support surface for drug packages.

16. A method of verifying a movement of drug packages onto a tray of a gripper, the method comprising:
moving a transport device arranged above the tray to a storage location of at least one drug package and gripping the at least one drug package;
moving the transport device from the storage location to the tray, the tray having an end portion with an arcuate front, the end portion forming a loading and unloading front;
checking, by at least one sensor arranged in the end portion, if a drug package is present in a detection area of the at least one sensor; and
providing a signal indicating a first erroneous removal attempt if the check is positive.

17. The method of claim 16, further comprising:
opening two elongated clamping jaws arranged above the tray and having mutually facing clamping surfaces;
moving the clamping jaws to the storage location in response to a positive check;
gripping, by the clamping jaws, a drug package arranged in the end portion;
moving the transport device from the storage location to the tray;
checking if a drug package is present in the detection area of the at least one sensor; and
providing a signal indicating a second erroneous removal attempt if the check is positive.

18. The method of claim 16, further comprising:
determining, by a plurality of sensors arranged in the tray, a width of the at least one drug package when moving the at least one drug package towards the tray;
comparing, by a control device, the determined width with a desired width; and
providing a corresponding signal when a limit deviation between the determined width and the desired width of the at least one drug package is exceeded.

19. The method of claim 18, further comprising:
moving the gripper towards an unloading station after providing the corresponding signal; and
transferring present drug packages to the unloading station.

20. The method of claim 16, further comprising:
coupling a jaw guide assembly of the gripper to a drive unit, wherein the jaw guide assembly includes a frame structure, first and second guides extending in parallel in a first direction and spaced apart from each other in a second direction;
coupling two first jaw carriages to the first guide;
coupling two second jaw carriages to the second guide; and
driving, by the drive unit, the jaw guide assembly in the first direction.

* * * * *